Patented May 3, 1932

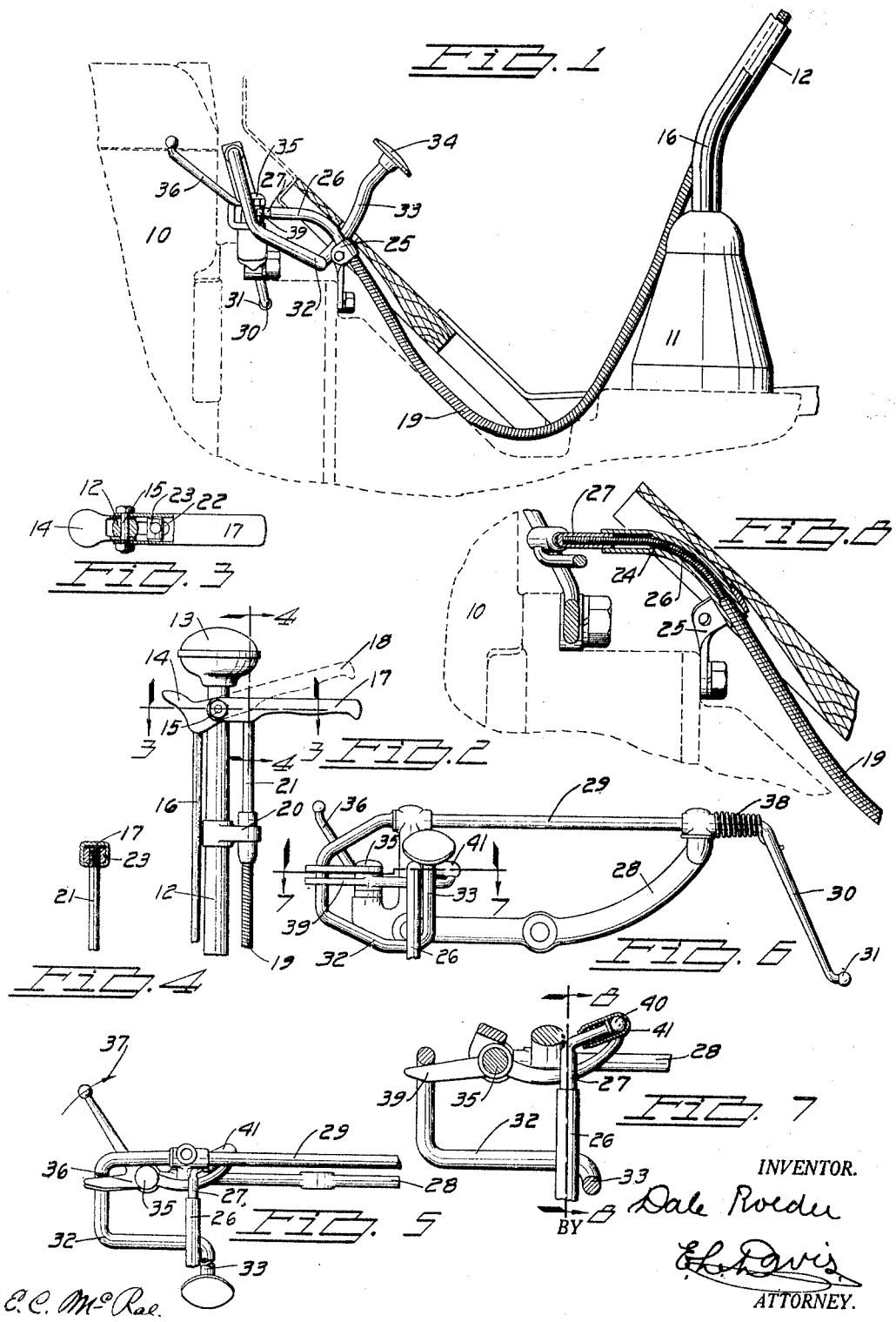

1,856,192

UNITED STATES PATENT OFFICE

DALE ROEDER, OF DEARBORN, MICHIGAN, ASSIGNOR TO FORD MOTOR COMPANY, OF DEARBORN, MICHIGAN, A CORPORATION OF DELAWARE

VEHICLE ENGINE ACCELERATOR

Application filed April 1, 1931. Serial No. 526,829.

The object of my invention is to provide an engine accelerator combined with a gear shift lever whereby the driver while shifting gears may, with the same hand, control the speed of the engine. With this device the other hand is free for steering the vehicle. This device is especially suitable for use on commercial vehicles, such as milk delivery wagons, wherein the driver stands up while operating the car. If such vehicle were provided with the conventional clutch and brake pedals together with the foot operated accelerator pedal, the vehicle would be difficult if not impossible to control. Consequently, such vehicles have heretofore been provided with a combined brake and clutch pedal, to be thereby operated by the same foot of the driver, and the acceleration of the engine has been controlled with the throttle on the steering wheel. It will be understood that when the driver is standing, it is possible for him to use only one foot on the controls and, inasmuch as the clutch pedal must be operated during the gear shifting, it is impossible to simultaneously operate the ordinary foot accelerator pedal, as provided in the conventional car. With my accelerator or throttle control the driver may simply depress the clutch pedal with his free foot while standing on the other, then shift the gears, and while engaging the clutch accelerate the engine by means of my hand-operated accelerator, all without removing his foot from the control pedal or his shifting hand from the gear shift ball.

More specifically, my invention consists of a radially extending handle hinged to the gear shift lever just below the operating ball, which lever is connected to a flexible reciprocating cable, the latter extending down along the gear shift lever, through the floor boards of the car, and to a position adjacent to the conventional accelerator pedal from where it is operatively connected to the throttle control mechanism.

My improved accelerator is especially suitable for use in connection with the Ford model "A" car to which my device may be readily installed without the alteration of any existing parts thereon. This is a very important feature from a commercial standpoint, for the reason that the device can be marketed as an accessory and be easily installed with a minimum of labor. A feature of this device is that the foot accelerator pedal with which the car is equipped may be operated without disturbing either of the other operating mechanisms, and in like manner the throttle on the steering wheel or my accelerator lever on the gear shifter may be operated independently of each other.

With these and other objects in view, my invention consists in the arrangement, construction, and combination of the various parts of my improved device, as described in the specifications, claimed in my claim and illustrated in the accompanying drawings, in which:

Figure 1 shows a vertical central sectional view through a Ford model A my improved device installed thereon, the engine and transmission being shown in dotted lines, while the existing throttle control mechanism and gear shift lever are shown in full to better illustrate the construction.

Figure 2 shows a rear view of the upper end of the gear shift lever, shown in Figure 1.

Figure 3 shows a sectional view, taken on the lines 3—3 of Figure 2.

Figure 4 shows a sectional view taken on the lines 4—4 of Figure 2.

Figure 5 shows a plan view of the accelerator shown in Figure 1.

Figure 6 shows a rear elevation of the device shown in Figure 5.

Figure 7 shows a sectional view taken on the line 7—7 of Figure 6, and

Figure 8 shows a sectional view taken on the line 8—8 of Figure 7.

Referring to the accompanying drawings, I have used the reference numeral 10 to designate the rear portion of an engine, shown in dotted lines, which engine is provided with a conventional sliding gear type transmission unit 11 from which a gear shift lever 12 extends upwardly to a position whereby it may be conveniently operated by the driver. The upper end of this gear shift lever is provided with a shifter knob or ball 13 whereby the lever may be shifted to its several positions to effect the various speeds of the transmission.

A latch actuator 14 is pivotally secured to the lever just below the ball 13 by means of a fulcrum pin 15 which actuator is operatively connected with a reciprocating rod 16, the latter extending down into the transmission to operate an auxiliary speed latching device in the transmission. This member 14 is arranged so that the thumb of the driver's right hand may conveniently operate same when he desires to use the auxiliary speed. Extending oppositely from the actuator 14, I have provided an accelerator handle 17 which is also pivoted to the lever 12 by means of the fulcrum pin 15 and which is in position so that the fingers of the driver's right hand may conveniently lift this lever upwardly when the shifter ball is grasped in the palm of the hand. Thus, the shifter ball may be moved to its several positions while at the same time the handle 17 may be simultaneously operated to control the speed of the engine. When the handle is raised to the position shown by dotted lines 18 then the throttle valve is opened to increase the speed of the engine.

One end of the flexible tubular housing 19 is fixedly secured to the upper end of the gear shift lever 12 just below the fulcrum pin 15 by means of a bracket 20, and a rod 21 is reciprocally mounted in this end of the tube which rod extends upwardly to the under side of the handle 17. This housing is preferably formed from a closely wound coil of spring wire. Referring to Figures 3 and 4, the handle 17 is formed having a hollow section. A slot 22 is provided in the under side of this handle through which the rod 21 projects and the upper end of this rod is threaded into a cylindrical nut 23 held within the handle by the edges thereof adjacent to the slot, so that actuation of the handle will reciprocate the nut 23 and rod 21.

The flexible housing 19 extends down along the gear shift lever 12 where it projects through the floor boards of the car, and then follows up along underneath the floor boards to a position just to the rear of the engine. This lastly described end of the housing is fixedly secured to a rigid piece of tubing 26 which is secured to the engine by means of a bracket 25, the latter being held in place by one of the transmission housing bolts. Extending through the flexible housing 19 and tube 26, I have provided a flexible reciprocated operating shaft 24 which is composed of several strands of music wire around which is wrapped a small closely wound helical coil spring. The shifter lever end of this cable is secured directly to the lower end of the rod 21 while the engine end of the cable is secured to a ball joint connection 27, which is reciprocally mounted in the outer end of the tube 26. Thus, when the handle 17 is oscillated the ball joint connection 27 will be reciprocated in the tube 26.

An accelerator bracket 28 is secured to the rear end of the engine, extending thereacross, which bracket consists of a U-shaped member having a transverse rod 29 rotatably mounted in the upper ends of its upwardly extending arms. It will be noted that the bracket and rod extend in a vertical plane across the rear face of the engine whereby rotation of the throttle lever on the steering wheel, the wheel being on the left hand side of the car, may be transmitted adjacent to the engine carburetor which is disposed on the right hand side of the car. That end of the rod 29 on the carburetor side of the engine is bent downwardly to form an arm 30, the lower end of which is provided with a ball 31 which may be conveniently connected to the carburetor throttle valve. The opposite end of the rod 29 is also bent downwardly to form an arm 32 in substantially the same plane as the arm 30. However, the lower end of the arm 32 is bent upwardly, in an arcuate direction, as at 33, whereby it may extend through the floor boards of the car in position to be conveniently depressed by the driver's foot. The upper end of this arcuate portion 33 is provided with a button 34 for this purpose.

In order to oscillate the rod 29 from the steering wheel throttle lever, a perpendicular fulcrum pin 35 is formed on the bracket 28 and a bell crank lever 36 is rotatably mounted on this pin, one arm of which extends outwardly to butt against the accelerator arm 32, while the other arm of the lever extends to position to be conveniently connected to the hand throttle on the steering wheel. Thus, actuation of the bell crank lever 36, in the direction shown by arrow 37, will actuate the arm 32, rod 29, and arm 30 to thereby open the carburetor throttle. Inasmuch as the bell crank lever 36 bears against only one side of the arm 32, a helical return spring 38 is provided around the rod 29 which bears against the bracket 28 and arm 30 to thereby resiliently urge the arm 32 into contact with the bell crank lever 36 at all times.

It will be noted that this bell crank lever 36 is provided with a pair of spaced bearings on the pin 35 which are formed by bending a portion of the lever back upon itself to form a U-shaped bearing so that the tendency for this lever to wabble is eliminated.

The applicant makes no claim for the bracket 28, rod 29, arms 30 and 32 or bell crank lever 36, inasmuch as these members are standard equipment on the Ford model A chassis, but are described in detail herein to illustrate the manner in which my accelerator cooperates with these members to control the engine from the gear shift lever.

In order to actuate the rod 29, I have provided a lever 39 which is pivoted on the fulcrum 35 between the arms of the bell crank lever 36, one end of this beam projecting outwardly just beneath one arm of the lever 36, and the other end of this lever extending inwardly to a position between the arms of the U-shaped bracket 28. It will readily be seen that this lever may be installed without the alteration of any parts and with only a minimum of labor. The inner end of the lever 39 is provided with a ball end 40 to which a tubular socket 41 is secured, which socket is resiliently held on the end of the connection 27 resiliently gripping the ball 40. Due to the small amount of room between the rear face of the engine and the floor boards of the car, the socket 41 is bent to one side, thereby permitting ample reciprocating movement of this socket to operate the device.

The operation of my device is simple and positive in that when the handle 17 is raised it draws the adjacent end of the shaft 24 upwardly which operates the connection 27 thereby oscillating the lever 39. One arm of this lever bearing against the arm 32 thereby rotates the rod 29 to control the carburetor. During this operation it will be noted that the throttle on the steering gear or the bell crank lever 36 is not disturbed.

Among the many advantages arising from the use of my improved device it may be well to mention that I have provided an accelerator which may be conveniently installed on any existing Ford model A chassis with a minimum amount of labor. Still further my accelerator being actuated simultaneously therewith and by the same hand which operates the gear shift lever may be advantageously used on delivery vehicles where the driver stands while driving.

Some changes may be made in the arrangement, construction, and combination of the various parts of my improved device without departing from the spirit of my invention, and it is my intention to cover by my claim such changes as may be reasonably included within the scope thereof.

I claim as my invention:

In a motor vehicle having a transmission gear shift lever, a shifter ball secured to the upper end of said lever, a handle pivotally secured to said lever just beneath the shifter ball, an accelerator rod rotatably mounted in position across the rear face of the engine, one end of said rod having an arm formed thereon operatively connected with the engine carburetor and the other end of said rod having a second arm formed thereon said arm extending through the vehicle floorboards in position to act as a foot accelerator pedal, a ball-crank lever pivotally mounted in position to manually actuate said foot accelerator arm, a second lever pivotally mounted in position to actuate said foot accelerator arm, a flexible housing secured to the upper end of the gear shift lever, said housing extending downwardly along the shift lever through the floorboards of the car and forwardly to position adjacent to the second mentioned lever, and a flexible shaft reciprocally mounted in said housing having its respective ends operatively connected to said handle and second mentioned lever, whereby gripping the shifter ball and handle simultaneously will actuate said accelerator rod to increase the speed of the engine.

DALE ROEDER.